(12) United States Patent
Uno

(10) Patent No.: US 10,540,131 B2
(45) Date of Patent: Jan. 21, 2020

(54) PRINTER AND RECORDING MEDIUM

(71) Applicant: BROTHER KOGYO KABUSHIKI KAISHA, Nagoya-shi, Aichi-ken (JP)

(72) Inventor: Masaru Uno, Toyokawa (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/709,805

(22) Filed: Sep. 20, 2017

(65) Prior Publication Data

US 2018/0285044 A1    Oct. 4, 2018

(30) Foreign Application Priority Data

Mar. 28, 2017   (JP) .............................. 2017-063967

(51) Int. Cl.
   *G06F 3/12*      (2006.01)
   *G06K 15/02*     (2006.01)
   *G06K 1/12*      (2006.01)
   *G06K 19/06*     (2006.01)
   *G06K 7/14*      (2006.01)
   *G06K 15/16*     (2006.01)

(52) U.S. Cl.
   CPC .......... *G06F 3/1297* (2013.01); *G06F 3/1204* (2013.01); *G06F 3/1205* (2013.01); *G06F 3/1231* (2013.01); *G06K 1/121* (2013.01); *G06K 7/1417* (2013.01); *G06K 15/022* (2013.01); *G06K 19/06028* (2013.01); *G06K 15/16* (2013.01)

(58) Field of Classification Search
   CPC ..................................................... G06F 3/1258
   See application file for complete search history.

(56) References Cited

U.S. PATENT DOCUMENTS 6,031,634 A * 2/2000 Shimada ............ H04N 1/32128
                                                358/426.05
6,041,165 A * 3/2000 Morikawa .......... H04N 1/00238
                                                358/1.2
7,684,065 B2 * 3/2010 Murakata ............. H04N 1/0084
                                                358/1.14

(Continued)

FOREIGN PATENT DOCUMENTS

JP      2013-178704 A     9/2013

*Primary Examiner* — Ted W Barnes
(74) *Attorney, Agent, or Firm* — Scully, Scott, Murphy & Presser, P.C.

(57) ABSTRACT

The disclosure discloses a printer including a memory that stores reference information indicating a reference setting state in relation to at least one operation setting item in relation to the printed matter production process by using a print-receiving medium, to be non-rewritable. When computer-executable instructions stored in memory executed by a processor, the printer to perform a difference information generation process and a difference information output process. In the difference information generation process, difference information is generated. The difference information indicates a difference of a setting state in relation to the at least one operation setting item at a predetermined timing determined in advance, from the reference setting state. In the difference information output process, the difference information generated in the difference information generation process is outputted to an exterior of the printer.

8 Claims, 11 Drawing Sheets

| OPERATION SETTING STATE INFORMATION A1 (PRESENT SETTING) | | OPERATION SETTING REFERENCE INFORMATION A0 (FACTORY DEFAULT) | |
|---|---|---|---|
| FONT SETTING | GOTHIC FONT, 12 POINT | FONT SETTING | GOTHIC FONT, 12 POINT |
| DECORATION SETTING | NONE | DECORATION SETTING | NONE |
| PRINTING DENSITY SETTING | LOW DENSITY | PRINTING DENSITY SETTING | MIDDLE DENSITY |
| PRINTING SPEED SETTING | HIGH SPEED | PRINTING SPEED SETTING | MIDDLE SPEED |
| RESOLUTION SETTING | LOW RESOLUTION | RESOLUTION SETTING | MIDDLE RESOLUTION |
| TAPE MARGIN SETTING | START END 5 mm, TERMINAL END 5 mm | TAPE MARGIN SETTING | START END 5 mm, TERMINAL END 5 mm |
| TEMPLATE SETTING | NONE | TEMPLATE SETTING | NONE |
| CUTTING SETTING | FULL CUTTING | CUTTING SETTING | FULL CUTTING |

EXTRACTION OF DIFFERENCE

| OPERATION SETTING DIFFERENCE INFORMATION a01 | |
|---|---|
| PRINTING DENSITY SETTING | LOW DENSITY |
| PRINTING SPEED SETTING | HIGH SPEED |
| RESOLUTION SETTING | LOW RESOLUTION |

(56) References Cited

U.S. PATENT DOCUMENTS

| | | | |
|---|---|---|---|
| 9,256,387 B2* | 2/2016 | Nishizawa | G06F 3/1253 |
| 10,089,050 B2* | 10/2018 | Asai | H04N 1/00222 |
| 2005/0024687 A1* | 2/2005 | Hanafusa | H04N 1/00209 |
| | | | 358/400 |
| 2006/0017962 A1* | 1/2006 | Burdette | H04N 1/00127 |
| | | | 358/1.15 |
| 2007/0042815 A1* | 2/2007 | Trap | H04L 29/06027 |
| | | | 455/575.1 |
| 2007/0183267 A1* | 8/2007 | Tanjima | G03G 15/5016 |
| | | | 368/82 |
| 2007/0284437 A1* | 12/2007 | Yamamoto | G03G 15/507 |
| | | | 235/380 |
| 2009/0033975 A1* | 2/2009 | Sakai | G06F 3/1212 |
| | | | 358/1.15 |
| 2009/0059311 A1* | 3/2009 | Nelson | H04N 1/00002 |
| | | | 358/406 |
| 2009/0128838 A1* | 5/2009 | Yamamoto | G06K 15/02 |
| | | | 358/1.9 |
| 2009/0213424 A1* | 8/2009 | Watanabe | G06F 3/1212 |
| | | | 358/1.15 |
| 2010/0085594 A1* | 4/2010 | Williams | G06F 3/1205 |
| | | | 358/1.15 |
| 2010/0166058 A1* | 7/2010 | Perlman | A63F 13/12 |
| | | | 375/240.02 |
| 2010/0166062 A1* | 7/2010 | Perlman | A63F 13/12 |
| | | | 375/240.05 |
| 2010/0167809 A1* | 7/2010 | Perlman | A63F 13/12 |
| | | | 463/24 |
| 2010/0188688 A1* | 7/2010 | Selvaraj | G06F 3/1204 |
| | | | 358/1.15 |
| 2010/0195132 A1* | 8/2010 | Takashima | G06F 3/1205 |
| | | | 358/1.13 |
| 2010/0228746 A1* | 9/2010 | Harada | G06F 3/04815 |
| | | | 707/752 |
| 2011/0004789 A1* | 1/2011 | Tsujimoto | G06F 11/1443 |
| | | | 714/18 |
| 2012/0044358 A1* | 2/2012 | Thomason | H04N 1/00204 |
| | | | 348/175 |
| 2012/0218581 A1* | 8/2012 | Konji | G06F 3/122 |
| | | | 358/1.13 |
| 2013/0036091 A1* | 2/2013 | Provenzano | G06F 17/30162 |
| | | | 707/624 |
| 2013/0235403 A1* | 9/2013 | Takara | H04N 1/00334 |
| | | | 358/1.13 |
| 2014/0304840 A1* | 10/2014 | Ohkado | G06F 21/60 |
| | | | 726/31 |
| 2015/0002864 A1* | 1/2015 | Yamamoto | G06K 15/4065 |
| | | | 358/1.2 |
| 2015/0146245 A1* | 5/2015 | Asai | H04N 1/00222 |
| | | | 358/1.15 |
| 2015/0153983 A1* | 6/2015 | Hayashi | G06F 3/1257 |
| | | | 358/1.15 |
| 2015/0169260 A1* | 6/2015 | McLeod | H04L 67/36 |
| | | | 358/1.15 |
| 2017/0206046 A1* | 7/2017 | Shimazawa | G06F 3/14 |
| 2018/0013603 A1* | 1/2018 | Lee | H04L 27/04 |

* cited by examiner

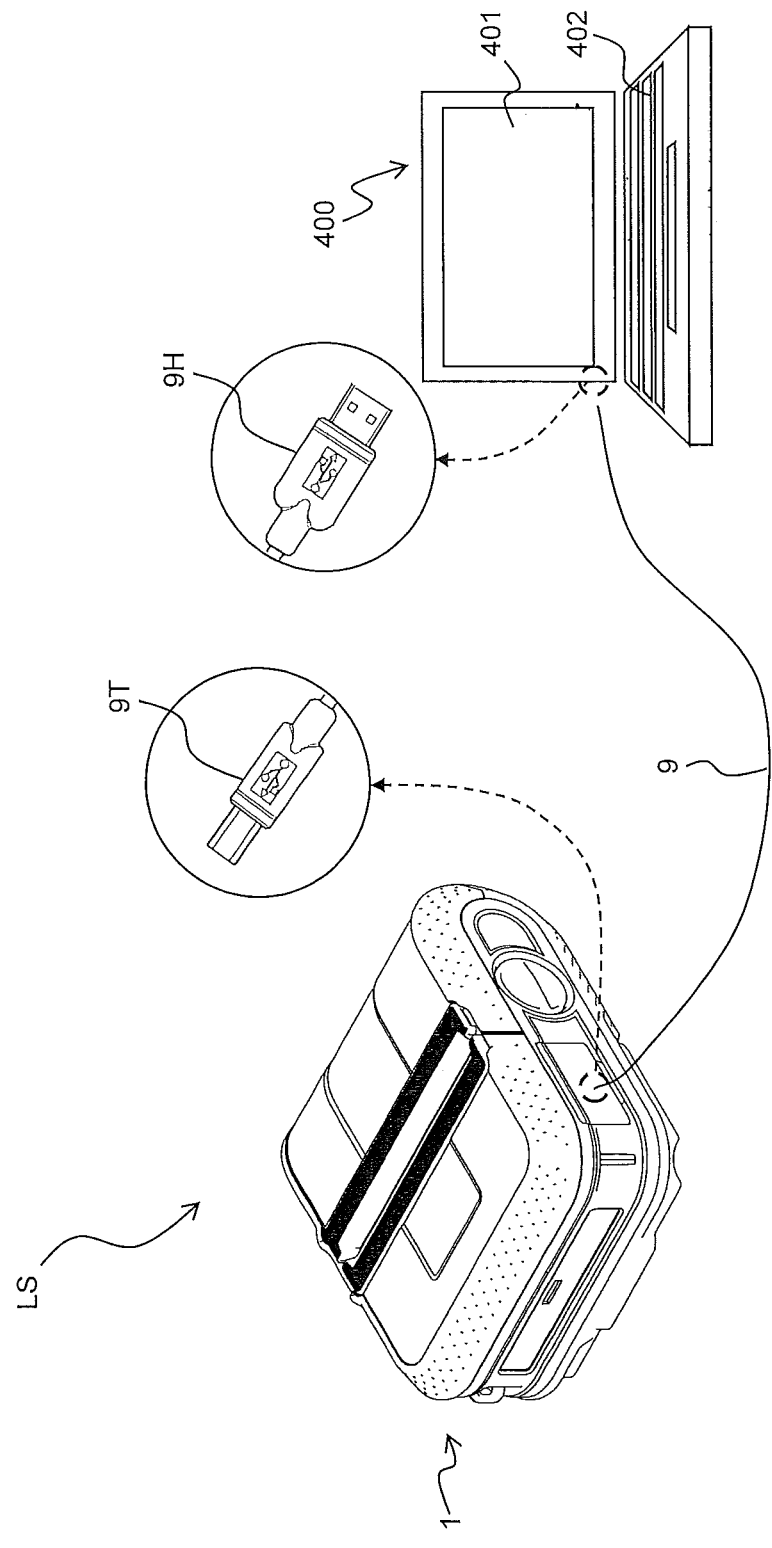
[FIG. 1]

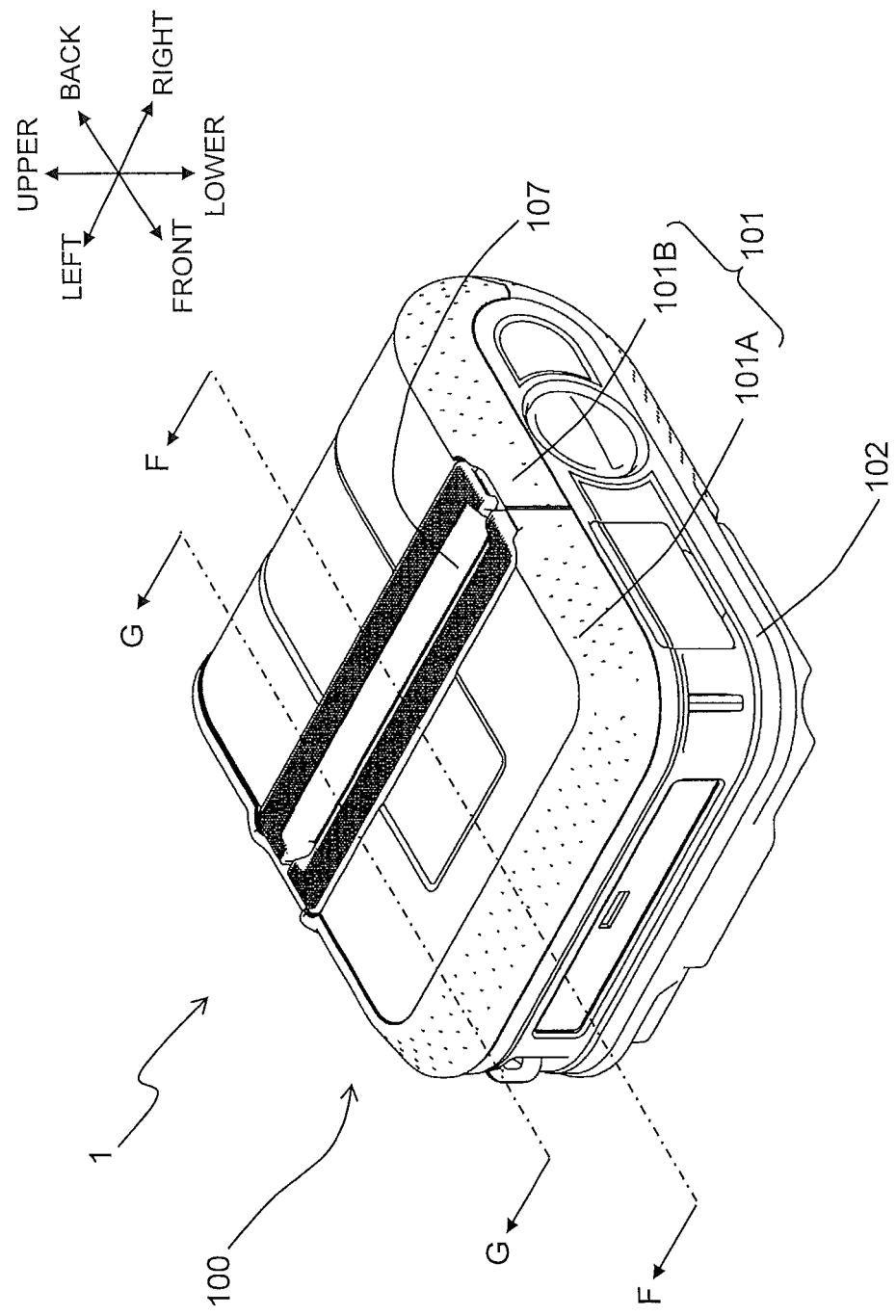
[FIG. 2]

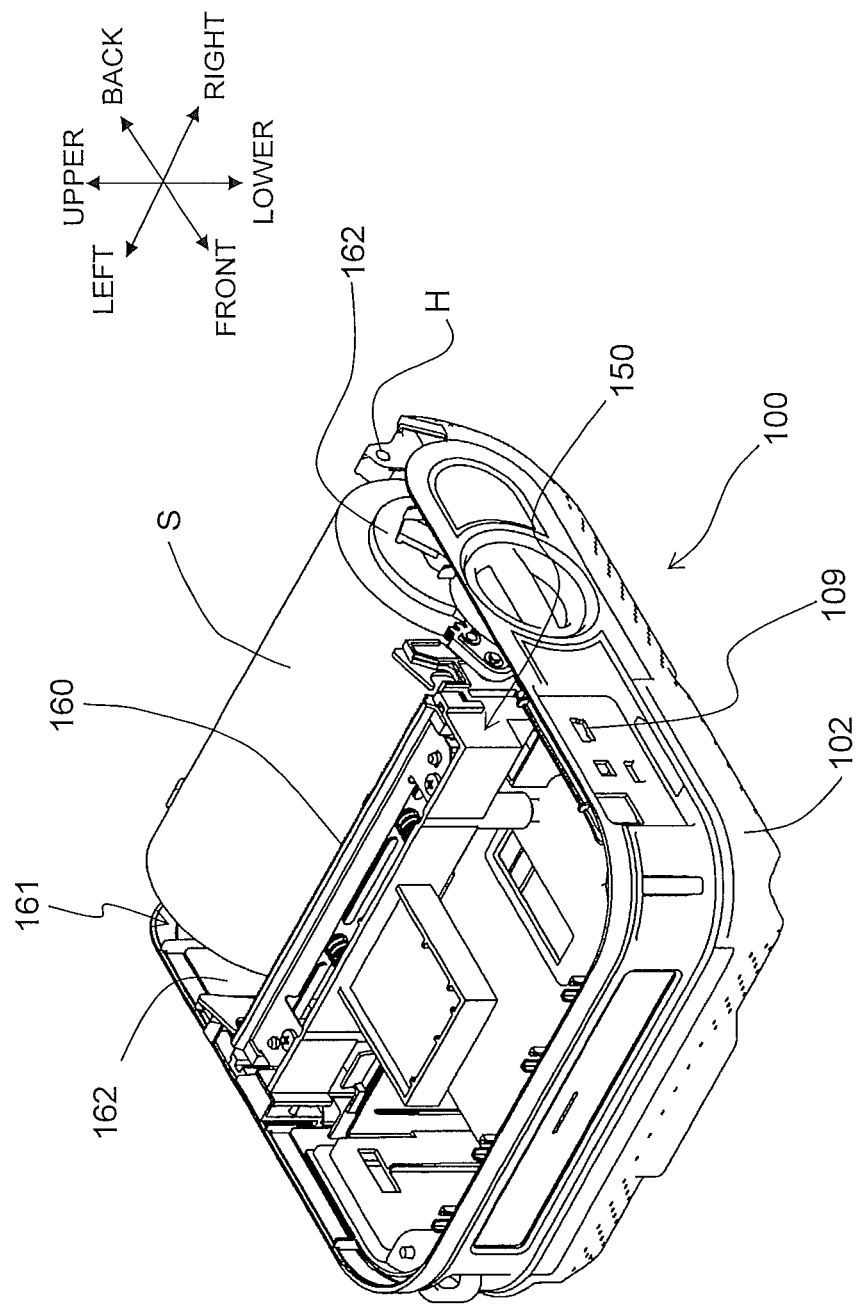
[FIG. 3]

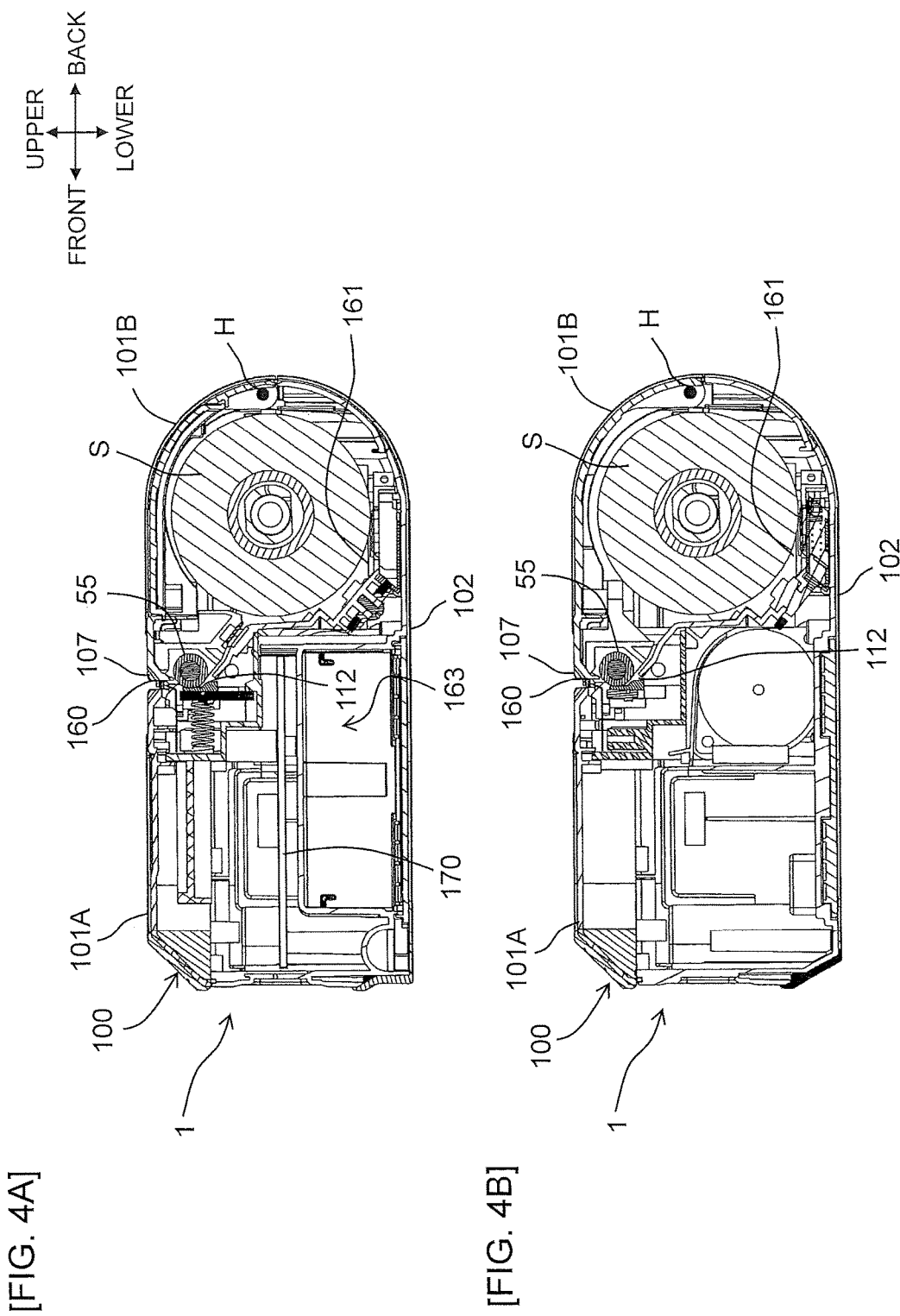

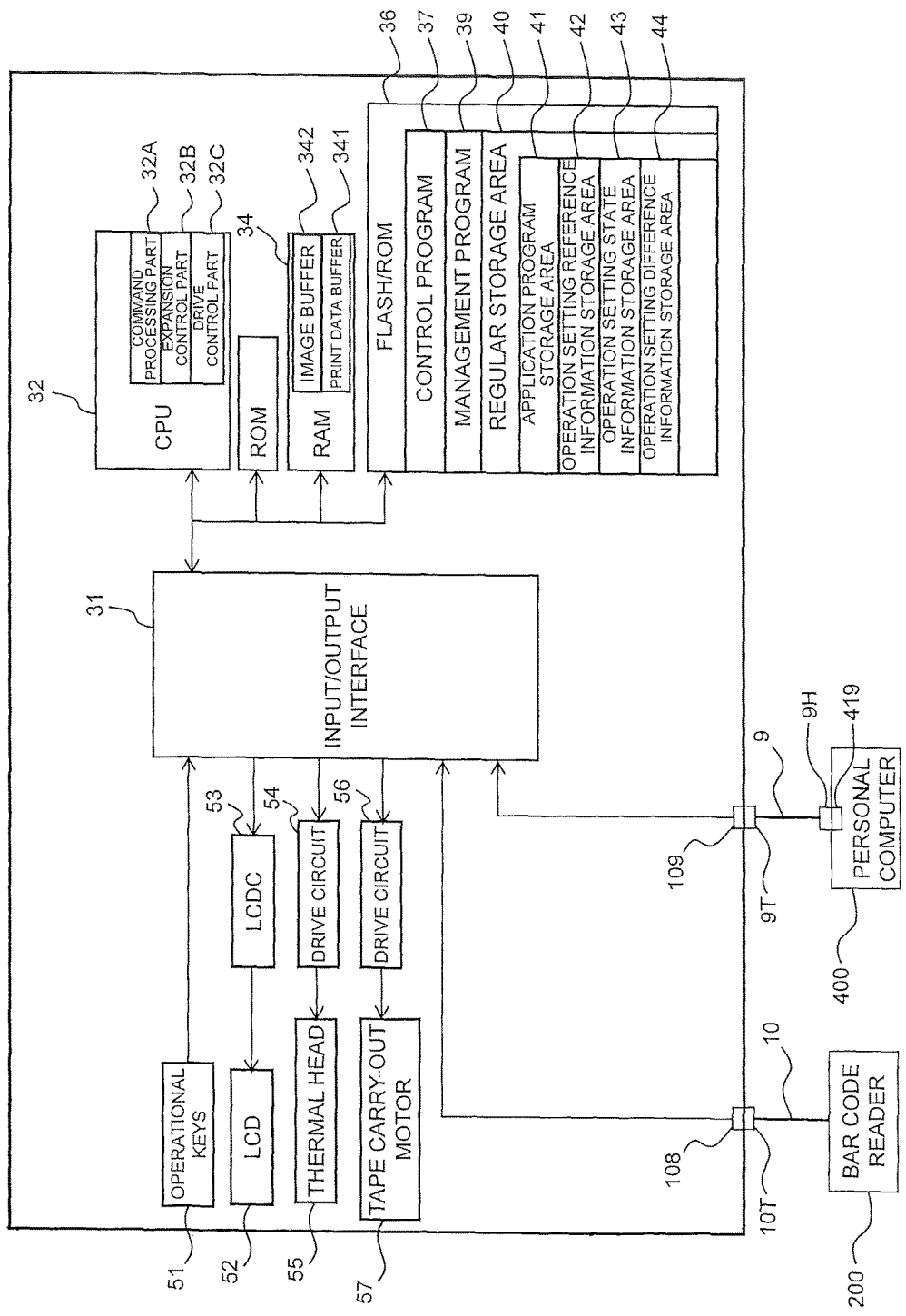

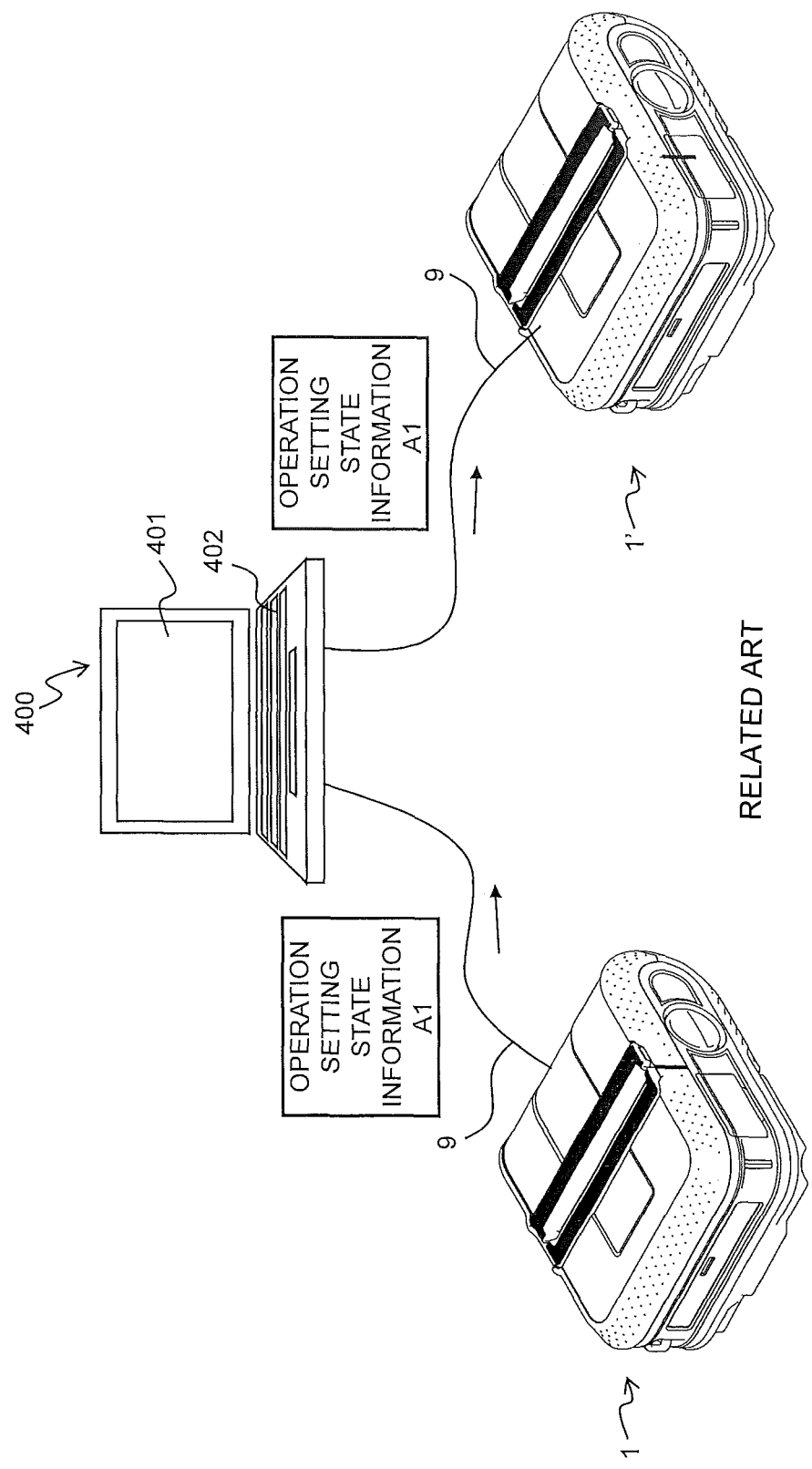

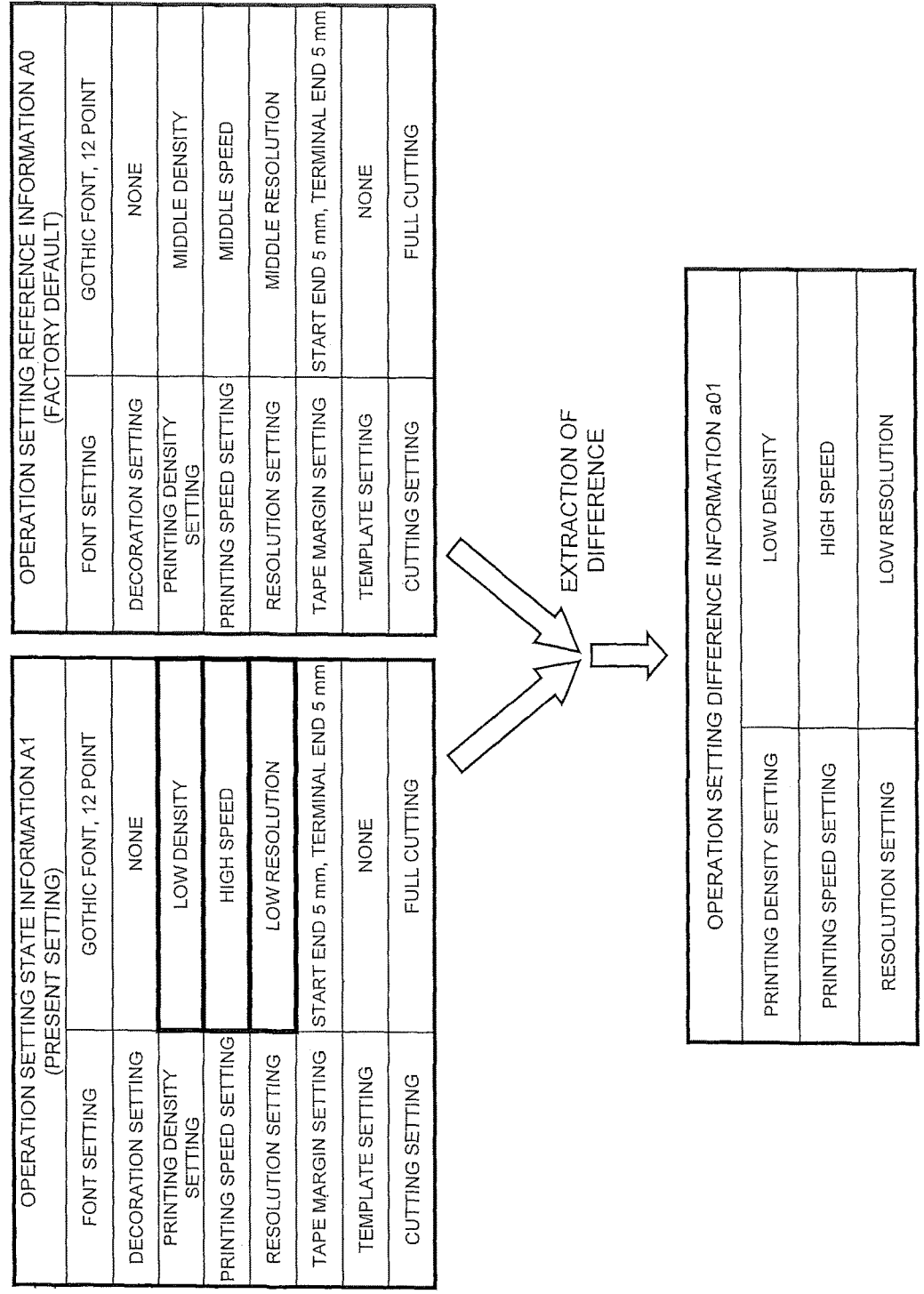
[FIG.7]

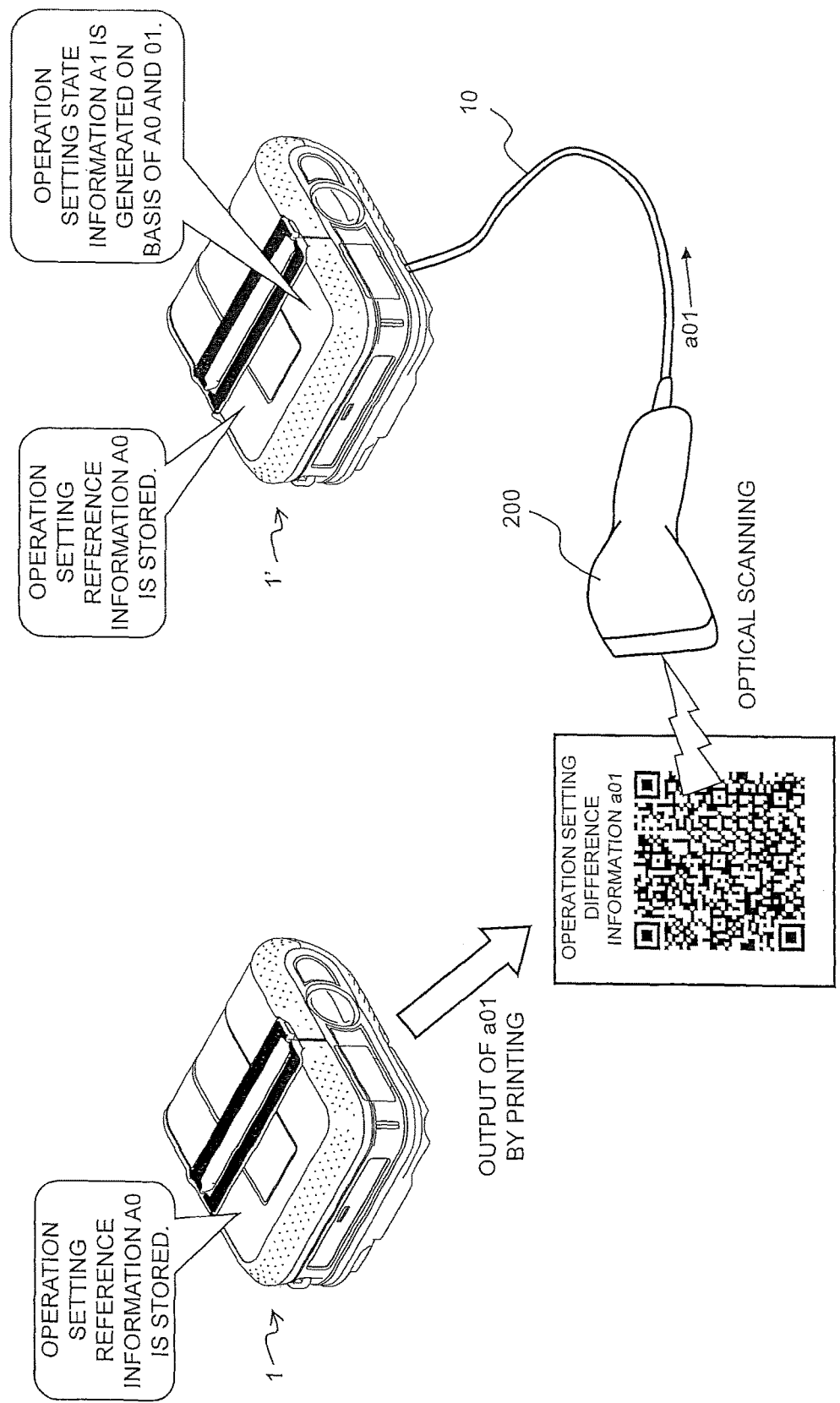

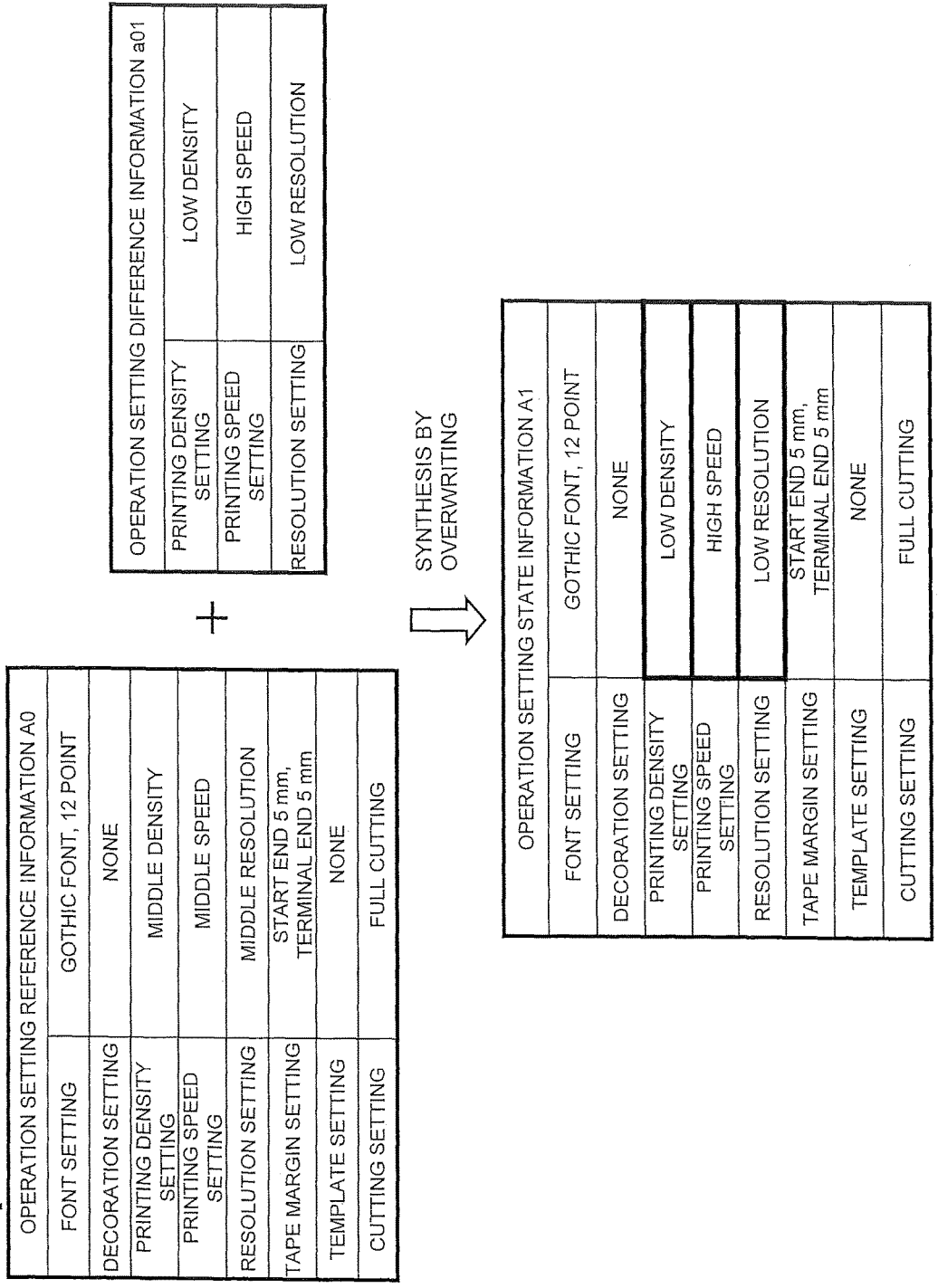

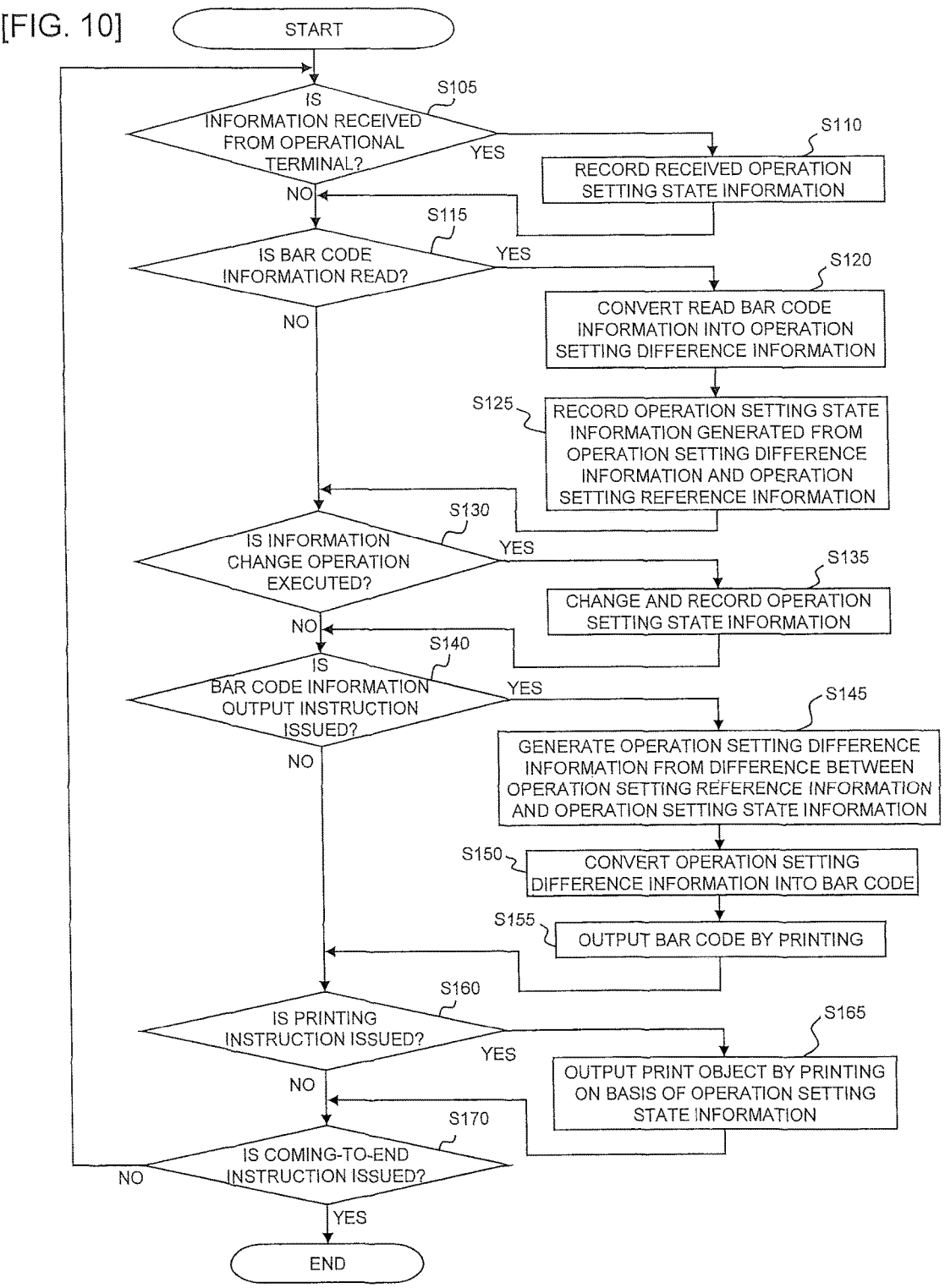
[FIG. 10]

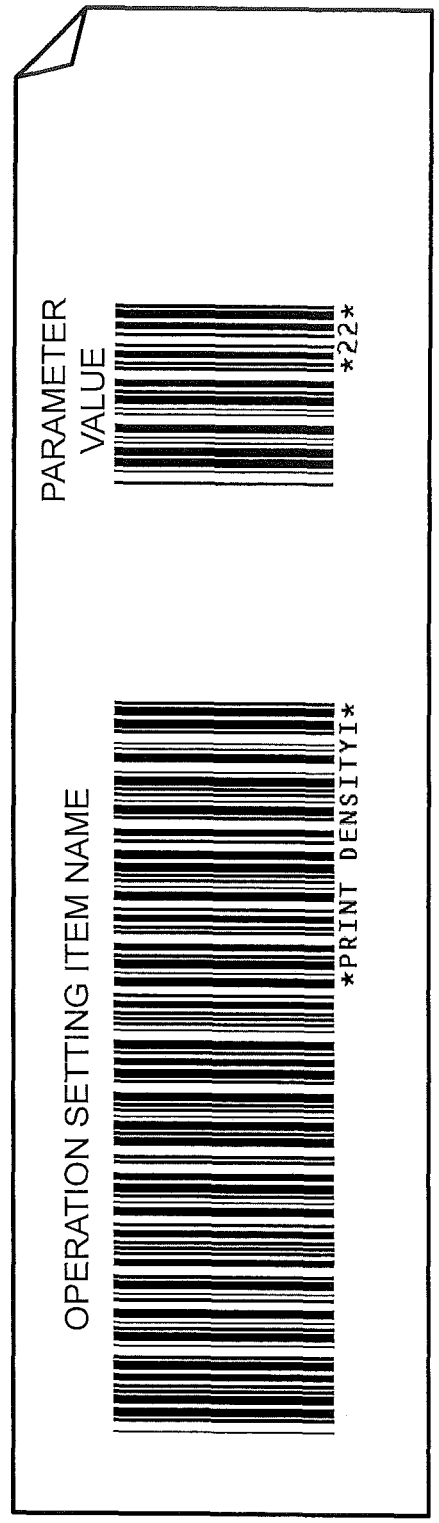
[FIG. 11]

PRINTER AND RECORDING MEDIUM

CROSS-REFERENCE TO RELATED APPLICATION

The present application claims priority from Japanese Patent Application No. 2017-63967, which was filed on Mar. 28, 2017, the disclosure of which is incorporated herein by reference in its entirety.

BACKGROUND

Field

The present disclosure relates to a printer that executes a printed matter production process, and a recording medium.

Description of the Related Art

For example, a technique according to which setting information in relation to a printing process is delivered from an operational terminal to a printer and the printer executes a printing process on which the setting information is reflected is known.

On the other hand, a user may desire to apply setting state information used when a printed matter is produced using one printer, as it is to production in another printer. With the prior art, however, to cause the setting state information to be transmitted from the one printer and to be received by the other printer, complicated and burdensome work of executing a transmission and a reception operations of the information through an operational terminal common to the printers is necessary.

SUMMARY

An object of the present disclosure is to provide a printer and a recording medium that can improve the convenience for the user by easily and simply reproducing the same setting states between printers.

In order to achieve the above-described object, according to an aspect of the present application, there is provided a printer comprising a feeder configured to feed a print-receiving medium, a printing head configured to execute formation of a print object on the print-receiving medium fed by the feeder, a processor configured to control the feeder and the printing head to execute a printed matter production process for producing a desired printed matter, and a memory that stores reference information indicating a reference setting state in relation to at least one operation setting item in relation to the printed matter production process by using the print-receiving medium, to be non-rewritable, the memory further storing computer-executable instructions that, when executed by the processor, cause the printer to perform a difference information generation process for generating difference information that indicates a difference of a setting state in relation to the at least one operation setting item at a predetermined timing determined in advance, from the reference setting state, and a difference information output process for outputting the difference information generated in the difference information generation process to an exterior of the printer.

BRIEF DESCRIPTION OF THE DRAWINGS

FIG. 1 is a system configuration view showing a printing management system that includes a printer in accordance with an embodiment of the present disclosure.

FIG. 2 is a perspective view showing an outlined configuration of the printer.

FIG. 3 is a perspective view showing the printer without a top cover of a housing thereof, seen from obliquely above on the front side.

FIG. 4A is a cross-sectional view showing a cross-section taken along an F-F cross-section in FIG. 2.

FIG. 4B is a cross-sectional view showing a cross-section taken along a G-G cross-section in FIG. 2.

FIG. 5 is a functional block view showing an electrical configuration of the printer.

FIG. 6 is a view showing Comparative Example of the prior art for the case where operation setting state information is copied and is transmitted from one printer to another printer.

FIG. 7 is an explanatory view showing generation of operation setting difference information.

FIG. 8 is a view showing the case of an embodiment where the operation setting difference information is copied and is transmitted from one printer to another printer.

FIG. 9 is an explanatory view showing reproduction of the operation setting state information from the operation setting difference information.

FIG. 10 is a flowchart showing an example of control steps executed by a CPU.

FIG. 11 is a view showing the operation setting state information that is output by printing as plural bar codes.

DETAILED DESCRIPTION OF THE PREFERRED EMBODIMENTS

An embodiment of the present disclosure will be described below with reference to the drawings.

<Printing Process System>

A printing process system including a printer of this embodiment will be described with reference to FIG. 1.

In FIG. 1, in a printing process system LS, an operational terminal to operate a printer 1 (a printer), that is, for example, a personal computer 400, and the printer 1 that executes printing in accordance with a print command (including print data and operation setting state information) received from the personal computer 400, are connected to each other by a universal serial bus (USB) cable 9.

The personal computer 400 is, for example, a commercially available multi-purpose personal computer and includes a display part 401 such as a liquid crystal display, and an operational part 402 such as a keyboard and a mouse. At a proper location of the personal computer 400 (for example, in the back face portion thereof), a USB port 419 (see FIG. 5 described later) to attach thereto and detach therefrom a connector 9H that is in one end portion of the USB cable 9 is disposed.

On a side face of the printer 1, a USB port 109 (see FIG. 5 described later) to attach thereto and detach therefrom a connector 9T in the other end portion on the side opposite to the side of the connector 9H of the USB cable 9 is disposed.

<Configuration of Printer>

The configuration of the printer 1 will be described with reference to FIG. 2 to FIG. 4. In FIG. 2 to FIG. 4, a lower right direction in FIG. 2 is defined as rightward, an upper left direction therein is defined as leftward, an upper right direction therein is defined as backward, a lower left direction therein is defined as frontward, an upward direction therein is defined as upward, and a downward direction therein is defined as downward (see arrows shown in each of FIG. 2 to FIG. 4).

As shown in FIG. 2 to FIG. 4, the printer 1 includes a substantially box-shaped housing 100 that constitutes the outer shell of the device. The housing 100 includes a top cover 101 that constitutes the upper portion of the outer shell of the device, and an under cover 102 that constitutes the lower portion of the outer shell of the device. The top cover 101 includes a fixed portion 101A and an opening and closing lid 101B.

A roll storage part 161 is disposed downward the opening and closing lid 101B of the top cover 101 (inside the housing 100) (see FIG. 3, FIG. 4). The roll storage part 161 has a roll paper sheet S stored therein with both end portions thereof rotatably journaled by supporting members 162 (see FIG. 3) and, as a result, the roll paper sheet S (a print-receiving medium) can continuously be supplied from the roll storage part 161. In this case, the opening and closing lid 101B is rotatably coupled to a back end portion of the under cover 102 through a hinge part H, and the roll storage part 161 can be exposed to the exterior of the device to enable easy attachment or easy replacement of the roll paper sheet S by setting the opening and closing lid 101B to be opened. A discharging exit 107 to discharge the roll paper sheet S after the printing executed therefor is disposed in a substantially central portion of the top cover 101 in the front-back direction.

A platen roller 111 (a feeder; see FIG. 4) is rotatably supported in the end portion on the front side of the opening and closing lid 101B. The platen roller 111 feeds the roll paper sheet S when the opening and closing lid 101B is set to be closed as above.

For the roll paper sheet S fed as above, a desired print is formed by a thermal head 55 (a printing head; see FIG. 4) that is in contact with the platen roller 111 by a predetermined pressing contact force. In this case, a tape carry-out motor 57 (see FIG. 5 described later) generating a driving force to drive and rotate the platen roller 111 is disposed inside the housing 100 and, when the opening and closing lid 101B is closed, the driving force of the tape carry-out motor 57 is transmitted to the platen roller 111 by a gear mechanism not shown. The driving of the tape carry-out motor 57 is controlled by a driving circuit 56 (see FIG. 5 described later) disposed on a control circuit board 170 (see FIG. 4A) arranged extending backward inside the housing 100. A battery power source storage part 163 (see FIG. 4A) into which a battery power source is inserted to be arranged therein from the lower face side of the under cover 102 is disposed downward the control circuit board 170 in the housing 100.

<Outlined Operation of Printer>

With the above configuration, when the printing is executed, the print command (including the print data and the operation setting state information) is transmitted by the personal computer 400 to the printer 1 through the USB cable 9 attached to the port 109 (see FIG. 3) disposed in the under cover 102. The roll paper sheet S in the roll storage part 161 is fed out by the rotation of the platen roller 111 on the basis of the driving force of the tape carry-out motor 57. The fed-out roll paper sheet S is inserted between the thermal head 55 and the platen roller 111 to pass therethrough, and the thermal head 55 executes printing in the desired mode on the basis of the print data for the roll paper sheet S. The roll paper sheet S after the printing is discharged from the discharging exit 107 to the exterior of the housing 100. A fixed blade 160 is disposed at a position downstream of the thermal head 55 in the feeding path for the roll paper sheet S. In this case, the fixed blade 160 is attached to a main chassis member 150 (see FIG. 3) disposed in the housing 100, to be along the discharging exit 107 inside the discharging exit 107. A user can manually cut off the end portion of the roll paper sheet S whose printing is completed as above and that is discharged from the discharging exit 107, by holding the end portion with the user's hand, applying the end portion to the fixed blade 160, and pulling the end portion to fold back the end portion.

<Electrical Configuration of Printer>

The electrical configuration of the printer 1 will be described with reference to FIG. 5. As shown in FIG. 5, the printer 1 includes an input/output interface 31, a CPU 32 (corresponding to a computing device), a ROM 33, a RAM 34, and a flash/ROM 36.

The input/output interface 31 is connected to operational keys 51, an LCDC 53, two driving circuits 54, 56, a reader port 108, the USB port 109, the CPU 32, the ROM 33, the RAM 34, and the flash/ROM 36.

The operational keys 51 include switches capable of inputting various instructions, and output the content of the input to the CPU 32 and the like through the input/output interface 31. The operational keys 51 correspond to an operation device and an instruction device described in the appended claims.

The LCDC 53 is connected to an LCD 52 that includes a liquid crystal display, and controls the display on the LCD 52 on the basis of the display content input thereinto through the input/output interface 31.

The driving circuit 54 is connected to the thermal head 55 and, when the print data is printed on the roll paper sheet S, drives the thermal head 55. The thermal head 55 includes plural heat generating elements that are arranged in a row in the direction perpendicular to the feeding direction of the roll paper sheet S. The heat generating elements form dots in print lines each formed by dividing the roll paper sheet S by the print resolution in the feeding direction.

The driving circuit 56 is connected to the tape carry-out motor 57 that is a pulse motor and that drives the platen roller 111 feeding the roll paper sheet S, and drives the tape carry-out motor 57 when the roll paper sheet S is fed out to the exterior.

A connector 10T of a reader cable 10 described later is attached to the reader port 108 of the printer 1, and a bar code reader 200 is connected to the printer 1 through the reader cable 10.

The connector 9T of the USB cable 9 is attached to the USB port 109 of the printer 1 and the personal computer 400 is connected to the printer 1 through the USB cable 9.

The ROM 33 has various control programs in relation to those other than the printing, and the like stored therein.

The RAM 34 has working areas disposed therein for the CPU 32 to execute the various control programs. For example, the RAM 34 has an image buffer 342 in which image data in accordance with the print command received from the personal computer 400 is expanded and a print data buffer 341 in which the print data in accordance with the image data expanded in the image buffer 342 is expanded, disposed therein. The "image data" as used herein refers to image data that is formed by, for example, bitmap-expanding the print content to be formed on a print-receiving medium (in this example, the roll paper sheet S) and the "print data" as used herein includes data to control the energy to be energized to form the image data with high quality on the print-receiving medium (in this example, the roll paper sheet S).

The flash/ROM 36 has a control program 37 in relation to the printing (including a program to execute the control content shown in, for example, FIG. 10 described later), a management table 39, and the like, stored therein, and further has a regular storage area 40 disposed therein. The regular storage area 40 has an application program storage area 41 an operation setting reference information storage area 42, an operation setting state information storage area 43, an operation setting difference information storage area 44, and the like disposed therein.

The CPU 32 executes the programs described later with reference to FIG. 10. In this example, the CPU 32 functionally includes a command processing part 32A, an expansion control part 32B, and a driving control part 32C.

The command processing part 32A receives the print command transmitted from the personal computer 400, and interprets/analyzes the received print command in accordance with a known technique.

The expansion control part 32B expands the image data in accordance with the result of the analysis by the command processing part 32A in the image buffer 342 (the details thereof will be described later), produces the print data in accordance with the image data, and expands the print data in the print data buffer 341.

The driving control part 32C executes printing for the roll paper sheet S using the thermal head 55 and using the print data expanded in the print data buffer 341 through the driving circuits 54, 56, and the like. The driving control part 32C also executes feeding of the roll paper sheet S through the driving circuit 54.

<Printed Matter Production Operation of Printer>

In this embodiment having the above configuration, the thermal head 55 forms a print on the roll paper sheet S fed by the platen roller 111. In this case, the platen roller 111 and the thermal head 55 execute a printing process on the basis of the control by each of the command processing part 32A, the expansion control part 32B, and the driving control part 32C of the CPU 32.

Triggered by the reception of the print command from the personal computer 400, the printer 1 controls the platen roller 111 and the thermal head 55 to form the print object in a print area of the roll paper sheet S. The roll paper sheet S having the print formed thereon is subsequently cut off by the fixed blade 160 at a position upstream of the print area in the feeding direction. As a result, the cut-off roll paper sheet S is separated from the rest and becomes a printed matter (for example, a print label).

<Operation Setting State Information, and Transmission and Reception Thereof>

For the printer that forms a printed matter as above, various operation setting items including at least one of; for example, a printing density setting, a printing speed setting, and a resolution setting for forming a print object are usually present, and what setting state is set can be determined for each thereof. The platen roller 111 and the thermal head 55 operate in accordance with the determined setting states and, as a result, the print object is formed in a mode in accordance with the user's intention.

In the above, the case where the user desires to apply the setting states used in producing a printed matter using one printer 1, as it is to another printer 1' may be present. For this case, in the prior art, as shown in FIG. 6 as Comparative Example, pieces of information on the setting states of the operation setting items are collectively handled as operation setting state information A, and this information is transmitted as it is to the other printer 1'. In this case, work to change the connection for cables to execute transmission and reception operations of information through a common operational terminal (the personal computer 400) as shown, or an operation procedure for transmission and reception of the information through a server common to a communication network not especially shown is necessary and this work is complicated and burdensome.

In contrast, in this embodiment, in the operation setting reference information storage area 42 of the flash/ROM 36, operation setting reference information A0 to be reference information (indicating the reference setting states each to be the reference for all the cases) in relation to the operation setting items is stored in advance at the time of shipment from the factory that manufactures the printer 1, and is stored therein to be non-rewritable. The flash/ROM 36 corresponds to a memory and a recording medium described in the appended claims.

When the user further changes arbitrarily the setting states for arbitrary operation setting items from the operation setting reference information A0, the pertinent operation setting state information A1 is generated and is recorded in the operation setting state information storage area 43 of the flash/ROM 36. The operation setting state information A1 may be set on the personal computer 400 that is the operational terminal and may be received by the printer 1.

As shown in FIG. 7, when the user separately inputs an operation that instructs transmission and reception of the operation setting state information between the printers 1, 1', operation setting difference information a01 indicating difference information indicating a portion in which the operation setting state information A1 differs from the operation setting reference information A0 (in the shown example, "low density" of the printing density setting, "high speed" of the printing speed setting, and "low resolution" of the resolution setting) is generated and is recorded in the operation setting difference information storage area 43 of the flash/ROM 36.

The data amount of the operation setting difference information a01 generated in this manner can significantly be reduced compared to those of the operation setting state information A1 and the operation setting reference information A0 that are pieces of source information thereof. As a result, in this embodiment, as shown in FIG. 8, the printer 1 itself generating the operation setting difference information a01 converts this information into an encoded image such as a QR code and outputs this information by printing on the roll paper sheet S. The other printer 1' to which the same setting states are desired to be applied optically reads the QR code using the bar code reader 200. As a result, the operation setting difference information a01 is transmitted in a simple technique.

As shown in FIG. 9, the printer 1' reading the operation setting difference information a01 overwrites the read operation setting difference information a01 on the operation setting reference information A0 similarly recorded and stored in advance in the operation setting reference information storage area 42 of the flash/ROM 36 for synthesis. As a result, the same operation setting state information A1 as that of the transmission source is reproduced.

<Control Steps>

To realize the above technique, the control steps executed by the CPU 32 will be described with reference to a flowchart in FIG. 10. Execution of this flowchart is started at the time point at which the power source of the printer 1 is turned on.

In FIG. 10, at step S105, the CPU 32 determines whether the operation setting state information is received from the personal computer 400 (in FIG. 10, represented as "operational terminal"). When the CPU 32 determines that the operation setting state information is not received from the personal computer 400, the determination is not satisfied (S105:NO) and the control step moves to step S115.

On the other hand, when the CPU 32 determines that the operation setting state information is received from the personal computer 400, the determination is satisfied (S105: YES) and the control step moves to step S110.

At step S110, the CPU 32 records the received operation setting state information in the operation setting state information storage area 43 of the flash/ROM 36. The control step moves to step S115.

At step S115, the CPU 32 determines whether the encoded image information (in FIG. 10, represented as "bar code information") such as a QR code is read from the bar code reader 200. When the CPU 32 determines that the encoded image information is not read, the determination is not satisfied (S115:NO) and the control step moves to step S130.

On the other hand, when the CPU 32 determines that the encoded image information is read from the bar code reader 200 (see FIG. 8), the determination is satisfied (S115:YES) and the control step moves to step S120.

At step S120, the CPU 32 converts the read encoded image information into the operation setting difference information.

The control step moves to step S125 at which the CPU 32 generates the operation setting state information (see FIG. 9) on the basis of the operation setting difference information acquired at step S120 and the operation setting reference information recorded in the flash/ROM 36, and record the operation setting state information in the flash/ROM 36. The control step moves to step S130.

At step S130, the CPU 32 determines whether the operation setting state information is changed by an input operation from the user through the operational keys 51. When the CPU 32 determines that the operation setting state information is not changed by the user, the determination is not satisfied (S130:NO) and the control step moves to step S140.

On the other hand, when the CPU 32 determines that the operation setting state information is changed, the determination is satisfied (S130:YES) and the control step moves to step S135.

At step S135, the CPU 32 changes the content of the operation setting state information recorded in the flash/ROM 36 in accordance with the content of a change operation input from the user. The control step moves to step S140.

At step S140, the CPU 32 determines whether any instruction to generate the operation setting difference information and to output by printing of the encoded image (in FIG. 10, represented as "bar code information") in accordance with the generated operation setting difference information is issued by an input operation from the user through the operational keys 51. When the CPU 32 determines that no instruction to generate the operation setting difference information and to output by printing of the encoded image in accordance therewith is issued, the determination is not satisfied (S140:NO) and the control step moves to step S160.

On the other hand, when the CPU 32 determines that the instruction from the user is issued, the determination is satisfied (S140:YES) and the control step moves to step S145.

At step S145, the CPU 32 extracts the difference between the operation setting state information and the operation setting reference information that are recorded in the flash/ROM 36 at this time point and, on the basis of this difference, generates the operation setting state difference information to be recorded therein (see FIG. 7).

The control step moves to step S150 at which the CPU 32 converts the operation setting difference information generated at step S145 into an encoded image (in FIG. 10, represented as "bar code information") such as a QR code.

The control step moves to step S155 at which the CPU 32 outputs by printing the encoded image acquired at step S150 to the roll paper sheet S. The control step moves to step S160.

At step S160, the CPU 32 determines whether an instruction to output by printing the print data that is already input separately is issued by an input operation from the user through the operational keys 51. When the CPU 32 determines that no instruction to output by printing the print data is issued, the determination is not satisfied (S160:NO) and the control step moves to step S170.

On the other hand, when the CPU 32 determines that the instruction to output by printing the print data is issued, the determination is satisfied (S160:YES) and the control step moves to step S165.

At step S165, the CPU 32 generates a print object from the print data that is already input separately on the basis of the operation setting state information recorded in the flash/ROM 36 at this time point, and outputs the print object by printing to the roll paper sheet S. The control step moves to step S170.

At step S170, the CPU 32 determines whether an instruction to cause the control process of the printer 1 to come to an end is issued by an input operation from the user through the operational keys 51. When the CPU 32 determines that no instruction to cause the control process to come to an end is input, the determination is not satisfied (S170:NO) and the control step returns to step S105 and the same steps are repeated.

On the other hand, when the CPU 32 determines that the instruction to cause the control process to come to an end is input, the determination is satisfied (S170:YES) and the CPU 32 causes this flow to come to an end.

In the above flow, the control step of step S165 corresponds to a printed matter production process described in the appended claims. The control step of step S145 corresponds to a difference information generation step and a difference information generation process described in the appended claims. The control steps of steps S150, S155 correspond to a difference information output step and a difference information output process described in the appended claims.

As above, in the printer 1 of this embodiment, the operation setting reference information A0 in relation to the operation setting items is prepared and stored and, only the difference acquired on the basis of the operation setting reference information A0 is generated and output as the new operation setting difference information a01.

In this embodiment, especially, at steps S150, S155, the platen roller 111 and the thermal head 55 are controlled to form the operation setting difference information a01 that is converted into a bar code on the roll paper sheet S.

In this embodiment, especially, the printer 1 further includes the operational keys 51, and generates the operation setting difference information a01 at step S145 when an instruction to generate the operation setting difference information a01 that is converted into a car code is issued using the operational keys 51.

The encoded image output by printing as the operation setting difference information a01 may be output by printing as an encoded image of a bar code shown in FIG. 11 in addition to the QR code as shown in FIG. 8. When the data amount of the operation setting difference information a01 becomes large, the operation setting difference information a01 may be printed as plural bar codes as shown and, in this case, each of the encoded images may be divided into pieces in accordance with the content of the data, converted, and output by printing.

In this embodiment, especially, the operation setting items includes at least one of the printing density setting, the printing speed setting, and the resolution setting used when the thermal head 55 forms a print object.'

<Modification Example>

The present is not limited to the embodiment and various modifications can be made thereto within the scope not departing from the gist and the technical idea thereof. Examples of the modifications will sequentially be described below.

<Timing of Generation of Operation Setting Difference Information a01>

The operation setting difference information a01 is generated when the generation of the operation setting difference information a01 and the outputting of the bar code information thereof are instructed through the operational input by the operational keys 51 in the embodiment while the present disclosure is not limited to this.

When the power source of the printer 1 is turned on, the operation setting difference information a01 may be generated using the operation setting state information A1 set and stored at this time point and the operation setting reference information A0 stored in advance.

Otherwise, when the operation setting state information A1 is newly input into the printer 1 from the exterior thereof such as the personal computer 400 and is recorded in the operation setting state information storage area 43 of the flash/ROM 36, the operation setting difference information a01 indicating the difference from this operation setting state information A1 may be generated.

Otherwise, the operation setting difference information a01 may be generated when, after the operation setting state information A1 is input into the printer 1 from the exterior thereof such as the personal computer 400 and is recorded in the operation setting state information storage area 43 of the flash/ROM 36, the recorded operation setting state information A1 is read and is reflected on at least one of the thermal head 55 and the platen roller 111.

Otherwise, the operation setting difference information a01 may be generated when an operation to change the setting state in relation to at least one operation setting item in accordance with an input operation on the operational keys 51 is executed.

<Designation of Operation Setting Items for Which Difference Information is Extracted>

The operation setting difference information a01 indicating the difference extracted between the operation setting reference information A0 and the operation setting state information A1 at that time point is generated in the embodiment while the present disclosure is not limited to this. The operation setting difference information a01 indicating the difference extracted for the operation setting items arbitrarily designated by the user may be generated, or the operation setting difference information a01 may be generated by merging the above extracted difference and the actually extracted difference with each other.

In the above description, "perpendicular" is not perpendicular in a strict meaning. This "perpendicular" means "substantially perpendicular" allowing the tolerance and the error relating to the design and the production.

In the above description, "parallel" is not parallel in a strict meaning. This "parallel" means "substantially parallel" allowing the tolerance and the error relating to the design and the production.

In the above description, "equal" has no strict meaning. This "equal" means "substantially parallel" allowing the tolerance and the error relating to the design and the production.

In the above, arrows shown in FIG. 5, FIG. 6, and FIG. 8 each indicate an example of the flow of the signal and each do not limit the direction of the flow of the signal.

The flowchart shown in FIG. 10 does not limit the present disclosure to the steps shown in this flow, and any addition/deletion to/from, any change of order, or the like of the steps may be made within the scope not departing from the gist and the technical idea of the present disclosure.

In addition to the above, the techniques in accordance with the embodiment and the modification examples may be used properly in combination.

In addition, though not specifically exemplified, the present disclosure is implemented with various changes made thereto within the scope not departing from the gist thereof.

What is claimed is:

1. A printer comprising:
a feeder configured to feed a print-receiving medium;
a printing head configured to execute formation of a print object on said print-receiving medium fed by said feeder;
a processor configured to control said feeder and said printing head to produce a desired printed matter; and
a memory that stores reference information indicating a reference setting state at a time of shipment from a factory that manufactures said printer in relation to a plurality of operation setting items in relation to said formation of said print object on said print-receiving medium, to be non-rewritable,
said memory further storing computer-executable instructions that, when executed by said processor, cause said printer to perform:
receiving a designation of a part of the plurality of operation setting items;
generating difference information, at a timing after the time of shipment from said factory, that indicates a difference of a setting state in relation to at least one operation setting item designated, from said reference setting state; and
outputting said difference information generated to an exterior of said printer.

2. The printer according to claim 1, wherein said difference information is outputted as a bar code, said feeder and said printing head are controlled to form said difference information converted into the bar code, on said print-receiving medium.

3. The printer according to claim 2, further comprising:
an instruction device capable of inputting an instruction to form said difference information converted into said bar code,
wherein said timing after the time of shipment from said factory is when said instruction device issues an instruction to form said difference information converted into said bar code.

4. The printer according to claim 1, wherein said timing after the time of shipment from said factory is when a power source is turned on.

5. The printer according to claim 1, wherein said timing after the time of shipment from said factory is when operation setting information in accordance with said setting state that is new is input from an exterior of the printer and recorded.

6. The printer according to claim 1, wherein said timing after the time of shipment from said factory is when, after operation setting information in accordance with said setting state that is new is input from an exterior of the printer and recorded, said operation setting information recorded is read and is reflected on at least one of said printing head and said feeder.

7. The printer according to claim 1, further comprising:
an operation device capable of operating to change said setting state in relation to said plurality of operation setting items, wherein said timing after the time of shipment from said factory is when an operation to change said setting state in relation to the at least one operation setting item designated by said operation device is performed.

8. A non-transitory computer-readable recording medium storing a printing process program stored to be readable by a computing device, which when executed by the computing device causes the computing device to execute a method, said computing device provided to a printer that comprises: a feeder configured to feed a print-receiving medium; a printing head configured to execute formation of a print object on said print-receiving medium fed by said feeder; said computing device configured to control said feeder and said printing head to produce a desired printed matter, and a memory that stores reference information to be non-rewritable that indicates a reference setting state at a time of shipment from a factory that manufactures said printer in relation a plurality of operation setting items in relation to said formation of said print object on said print-receiving medium, said method comprising:
generating difference information at a timing after the time of shipment from said factory, that indicates a difference of a setting state in relation to at least one operation setting item designated, from said reference setting state; and
outputting said difference information generated to an exterior of said printer.

* * * * *

UNITED STATES PATENT AND TRADEMARK OFFICE
CERTIFICATE OF CORRECTION

Page 1 of 1

PATENT NO. : 10,540,131 B2
APPLICATION NO. : 15/709805
DATED : January 21, 2020
INVENTOR(S) : Masaru Uno It is certified that error appears in the above-identified patent and that said Letters Patent is hereby corrected as shown below:

In the Claims

Column 12, Claim 8, Line 14 should read:
generating difference information, at a timing after the Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*